(12) United States Patent
Kong et al.

(10) Patent No.: US 8,028,215 B2
(45) Date of Patent: Sep. 27, 2011

(54) ERROR CONTROL CODE APPARATUSES AND METHODS OF USING THE SAME

(75) Inventors: Jun Jin Kong, Yongin-si (KR); Seung-Hwan Song, Incheon (KR); Young Hwan Lee, Suwon-si (KR); Dong Hyuk Chae, Seoul (KR); Kyong Lae Cho, Yongin-si (KR); Nam Phil Jo, Seoul (KR); Sung Chung Park, Daejeon (KR); Dong Ku Kang, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1028 days.

(21) Appl. No.: 11/905,733

(22) Filed: Oct. 3, 2007

(65) Prior Publication Data
US 2008/0276149 A1 Nov. 6, 2008

(30) Foreign Application Priority Data
May 4, 2007 (KR) .................. 10-2007-0043669

(51) Int. Cl.
*H03M 13/00* (2006.01)
*G06F 11/00* (2006.01)
(52) U.S. Cl. ........................ 714/752; 714/704
(58) Field of Classification Search ............ 714/704, 714/746, 752
See application file for complete search history.

(56) References Cited

U.S. PATENT DOCUMENTS

| | | | | |
|---|---|---|---|---|
| 4,866,719 A | * | 9/1989 | Morgan et al. | 714/704 |
| 5,784,356 A | * | 7/1998 | Hayashi et al. | 369/47.25 |
| 6,212,659 B1 | * | 4/2001 | Zehavi | 714/755 |
| 6,651,212 B1 | * | 11/2003 | Katayama et al. | 714/763 |
| 7,844,877 B2 | * | 11/2010 | Litsyn et al. | 714/752 |
| 7,890,818 B2 | * | 2/2011 | Kong et al. | 714/704 |

FOREIGN PATENT DOCUMENTS

| | | |
|---|---|---|
| JP | 2005-072975 A | 3/2005 |
| JP | 2005-151299 A | 6/2005 |
| JP | 2006-269063 | 10/2006 |
| JP | 2006-304348 | 11/2006 |
| KR | 1020030049178 | 6/2003 |
| KR | 1020030085871 | 11/2003 |

OTHER PUBLICATIONS

Notice of Allowance issued by the Korean Intellectual Property Office on Nov. 28, 2009, for corresponding Korean Patent Application No. 10-2007-0043669, (no English translation).

* cited by examiner

*Primary Examiner* — Phung M Chung
(74) *Attorney, Agent, or Firm* — Harness, Dickey & Pierce, P.L.C.

(57) ABSTRACT

An Error Control Code (ECC) apparatus may include a control signal generator that generates an ECC control signal based on channel information. The ECC apparatus also may include: a plurality of ECC encoding controllers that output data respectively inputted via storage elements corresponding to the ECC control signal; and/or an encoding unit that encodes, using a plurality of data outputted from the plurality of ECC encoding controllers, encoding input data into a number of subdata corresponding to the ECC control signal. In addition or in the alternative, the ECC apparatus may include: a plurality of ECC decoding controllers that output data respectively inputted via the storage elements corresponding to the ECC control signal; and/or a decoding unit that decodes, using a plurality of data outputted from the plurality of ECC decoding controllers, a number of decoding input data corresponding to the ECC control signal into one piece of output data.

28 Claims, 5 Drawing Sheets

ERROR CONTROL CODE APPARATUSES AND METHODS OF USING THE SAME

PRIORITY STATEMENT

This application claims priority from Korean Patent Application No. 10-2007-0043669, filed on May 4, 2007, in the Korean Intellectual Property Office (KIPO), the entire contents of which are incorporated herein by reference.

BACKGROUND

1. Field

Example embodiments relate to Error Control Codes (ECC). Also, example embodiments relate to ECC apparatuses and methods that may control a number of storage elements, depending on an error level generated in a channel using an I-interleaved coding scheme, and may control ECC performance.

2. Description of Related Art

When error levels generated in a channel are different, an Error Control Code (ECC) structure optimized depending on an error level is generally embodied.

Specifically, when the error level generated in the channel is low, a desired level of performance may be realized by an ECC of a simple structure having a low error correction capability. However, when the error level generated in the channel is high, an ECC structure having a high error correction capability and high-level complexity is required to realize the desired level of performance.

Generally, as a coding scheme having a high interleaving level is used, an error correction capability is increased. However, complexity and latency are increased and a code rate is decreased. Also, as a coding scheme having a low interleaving level is used, the error correction capability is decreased. However, complexity and latency are decreased and the code rate is increased.

Accordingly, when the error level generated in the channel is high, the coding scheme having the high interleaving level may be generally used, and when the error level generated in the channel is low, the coding scheme having the low interleaving level may be generally used.

However, since an ECC calculation is performed using a high-level interleaved coding scheme regardless of the error level of the channel changed when an interleaving level is fixedly used while the error level generated in the channel is high, latency is unnecessarily increased when the error level of the channel is lowered. Also, since unnecessarily redundant data transmission is required, a ratio of an information amount to a total code length, that is, the code rate is unnecessarily lowered.

Also, several structures may be configured together in order to use an ECC structure using a low-level interleaved coding scheme when the error level generated in the channel is low, and to use an ECC structure using the high-level interleaved coding scheme when the error level generated in the channel is high. However, complexity of a circuit is increased in this case.

Also, it is well-known that a correction capability of a continuous bit error corresponding to a burst error is increased when an interleaved coding scheme is generally used.

Accordingly, an ECC apparatus and method which can control a number of storage elements depending on an error level generated in a channel using an I-interleaved coding scheme, and control ECC performance is required.

SUMMARY

Example embodiments may provide Error Control Code (ECC) apparatuses and/or methods that may control a number of storage elements depending on an error level generated in a channel from a generator polynomial using an I-interleaved coding scheme, thereby reducing latency of encoding and/or decoding.

Example embodiments also may provide ECC apparatuses and/or methods that may control a number of storage elements depending on an error level generated in a channel, thereby improving a code rate.

Example embodiments also may provide ECC structures that may control ECC performance, depending on an error level generated in a channel using an I-interleaved coding scheme, and/or may have low-level complexity.

Example embodiments also may provide ECC structures that may control ECC performance, depending on a change of an error level when an error level of a channel is changed, depending on a number of times of repetitious usage of a product and/or a period of time of usage.

Example embodiments also may provide ECC structures that may control ECC performance, depending on a change of a channel error level by a Single Level Cell (SLC) operation method and/or a Multi-Level Cell (MLC) operation method of a memory cell when a memory is used for a channel.

Example embodiments also may provide ECC structures that may control ECC performance, depending on a change of an error level for a usage bit including a Most Significant Bit (MSB), a Least Significant Bit (LSB), and the like, when a memory of an MLC operation method is used for a channel.

According to example embodiments, an ECC apparatus may include: a control signal generator that generates an ECC control signal based on channel information; a plurality of ECC encoding controllers that output data respectively inputted via a number of first, second, or first and second storage elements corresponding to the ECC control signal; and/or an encoding unit that encodes, using a plurality of data outputted from the plurality of ECC encoding controllers, encoding input data into a number of subdata corresponding to the ECC control signal.

According to example embodiments, an ECC apparatus may include: a control signal generator that generates an ECC control signal based on channel information; a plurality of ECC decoding controllers that output data respectively inputted via a number of first, second, or first and second storage elements corresponding to the ECC control signal; and/or a decoding unit that decodes, using a plurality of data outputted from the plurality of ECC decoding controllers, a number of decoding input data corresponding to the ECC control signal into one piece of output data.

According to example embodiments, an ECC method may include: generating an ECC control signal based on channel information; outputting data respectively inputted via a number of storage elements corresponding to the ECC control signal; generating a plurality of ECC encoding control data; and/or encoding, using the plurality of ECC encoding control data, encoding input data into a number of subdata corresponding to the ECC control signal.

According to example embodiments, an ECC method may include: generating an ECC control signal based on channel information; outputting data respectively inputted via a number of storage elements corresponding to the ECC control signal; generating a plurality of ECC decoding control data;

and/or decoding, using the plurality of ECC decoding control data, a number of decoding input data corresponding to the ECC control signal into one piece of output data.

According to example embodiments, in a computer-readable recording medium storing a program for implementing an ECC method, the method may include: generating an ECC control signal based on channel information; outputting data respectively inputted via a number of storage elements corresponding to the ECC control signal, generating a plurality of ECC encoding control data; and/or encoding, using the plurality of ECC encoding control data, encoding input data into a number of subdata corresponding to the ECC control signal.

According to example embodiments, in a computer-readable recording medium storing a program for implementing an ECC method, the method may include: generating an ECC control signal based on channel information; outputting data respectively inputted via a number of storage elements corresponding to the ECC control signal; generating a plurality of ECC decoding control data; and decoding, using the plurality of ECC decoding control data, a number of decoding input data corresponding to the ECC control signal into one piece of output data.

BRIEF DESCRIPTION OF THE DRAWINGS

The above and/or other aspects and advantages will become more apparent and more readily appreciated from the following detailed description of example embodiments taken in conjunction with the accompanying drawings, in which.

DETAILED DESCRIPTION OF EXAMPLE EMBODIMENTS

Figure 1:
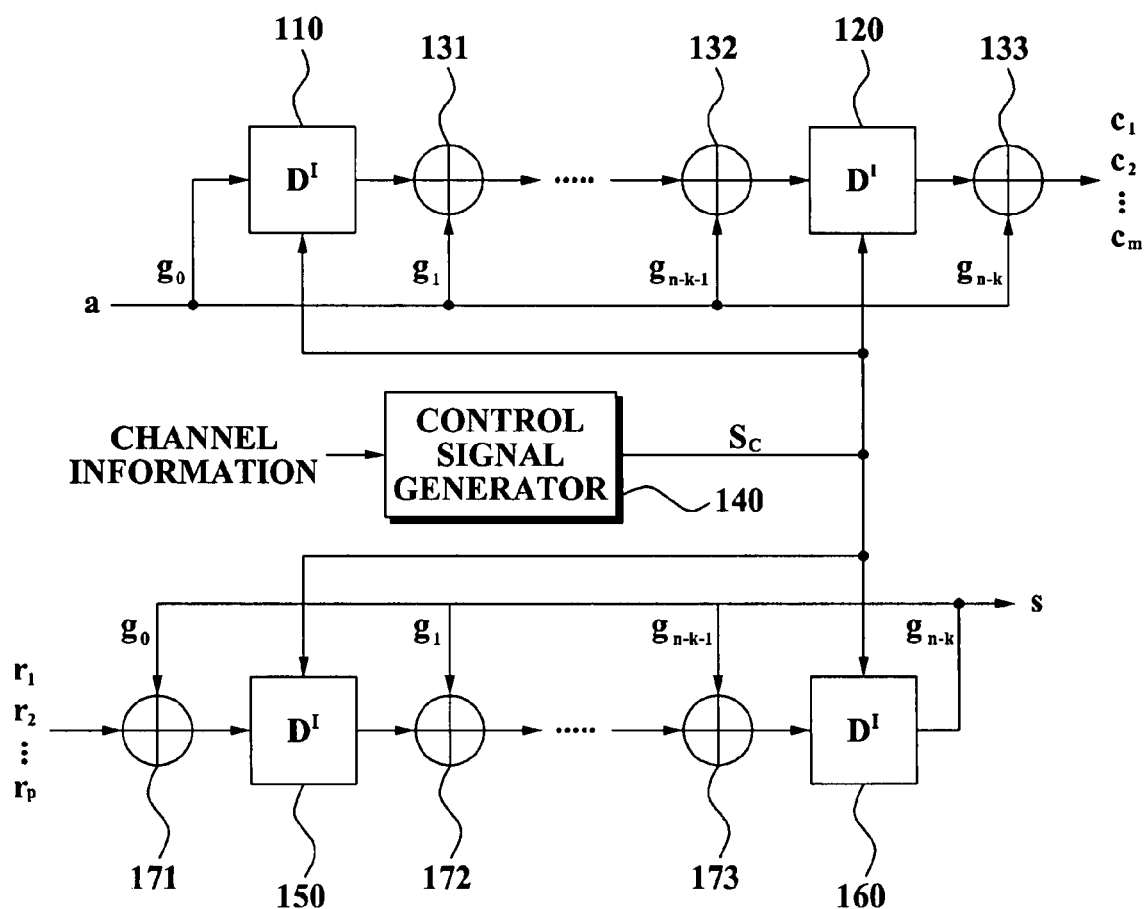
FIG. 1 is a block diagram illustrating an ECC apparatus according to exemplary embodiments.

Example embodiments will now be described more fully with reference to the accompanying drawings. Embodiments, however, may be embodied in many different forms and should not be construed as being limited to example embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a block diagram illustrating an ECC apparatus according to exemplary embodiments.

Referring to FIG. 1, the ECC apparatus may include a control signal generator 140, a plurality of ECC encoding controllers 110 and 120, a plurality of ECC decoding controllers 150 and 160, an encoding unit, and/or a decoding unit.

The control signal generator 140 may generate an ECC control signal $S_c$ based on channel information.

In example embodiments, the channel information may be a Bit Error Rate (BER) of a channel side, a Received Signal Strength Indication (RSSI) of a channel side, a user input signal inputted from a user, and the like, and the channel information may include other information besides the BER, the RSSI, and/or the user input signal indicating a channel error level.

A channel may be, for example, a communication channel, a storage channel, and the like, and examples of the channel may be a wireless section, a hard disk (HD), a Compact Disk (CD), a Digital Video Disk (DVD), a memory, and the like. Also, the channel in example embodiments may be the memory.

In example embodiments, the memory may include a memory of a Single Level Cell (SLC) method and/or a memory of a Multi-Level Cell (MLC) method.

As an example, when a data storage apparatus is used for the channel, the channel information may be reliability, including endurance of a storage apparatus, retention of stored data, and the like.

As another example, when the memory is used for the channel, the channel information may include whether to be either the memory of the SLC method or the memory of the MLC method, depending on a data amount which may be stored in a unit memory cell, and the like.

As still another example, when the memory of the MLC method is used for the channel, the channel information may be bit information of data stored in the memory. The bit information of the data stored in the MLC memory may include, for example, a Most Significant Bit (MSB), a Least Significant Bit (LSB), and the like.

In example embodiments, the control signal generator 140 may generate the ECC control signal $S_c$ selecting any one of output signals of storage elements D included in the plurality of ECC encoding controllers 110 and 120 and/or the plurality of ECC decoding controllers 150 and 160.

In example embodiments, the control signal generator 140 may respectively generate the ECC control signal $S_c$ selecting any one of the output signals of storage elements D included in the plurality of ECC encoding controllers 110 and 120, and/or the ECC control signal $S_c$ selecting any one of the output signals of storage elements D included in the plurality of ECC decoding controllers 150 and 160. In example embodiments, when a decoded plurality of data is generated by encoding specific data, the ECC control signal $S_c$ selecting any one of the output signals of storage elements D included in the plurality of ECC decoding controllers 150 and 160 may be identical to the ECC control signal $S_c$ selecting any one of the output signals of storage elements D included in the plurality of ECC encoding controllers 110 and 120 when the specific data is encoded. For example, when data a is encoded into subdata $c_1$ and $c_2$ using a signal outputted by two storage elements of a plurality of storage elements D, the control signal generator 140 may generate the ECC control signal $S_c$ selecting the signal outputted by the two storage elements from among output signals of the plurality of storage elements D in order to decode the encoded subdata $c_1$ and $c_2$, and may output the ECC control signal $S_c$ to the plurality of ECC decoding controllers 150 and 160.

In example embodiments, the control signal generator 140 may generate the ECC control signal $S_c$ including information of any one to be selected from the output signals of storage elements D included in the plurality of ECC encoding controllers 110 and 120, and/or information of any one to be selected from the output signals of storage elements D included in the plurality of ECC decoding controllers 150 and 160. For example, the control signal generator 140 may generate an 8-bit ECC control signal $S_c$ of adding a bit number denoting any one to be selected from the output signals of storage elements D included in the plurality of ECC encoding controllers 110 and 120, for example, 4 bits, to a bit number denoting any one to be selected from the output signals of storage elements D included in the plurality of ECC decoding controllers 150 and 160, for example, 4 bits.

Each of the plurality of ECC encoding controllers 110 and 120 may include I-number of storage elements D, and may output the data inputted based on the ECC control signal $S_c$ generated by the control signal generator 140 via the number of storage elements D corresponding to the ECC control signal S, from among the I-number of storage elements D.

In example embodiments, each of the plurality of ECC encoding controllers 110 and 120 may output any one of a plurality of output data of the I-number of storage elements D connected in series, based on the ECC control signal $S_c$.

In example embodiments, each of the plurality of ECC encoding controllers 110 and 120 may receive either data of multiplying input data a by a weight that may or may not be predetermined, for example, any one weight of go through $g_{n-k-1}$, or data of adding multiplied data to the output data of the plurality of ECC encoding controllers 110 and 120, and may output the signal outputted via the number of storage elements D corresponding to the ECC control signal $S_c$ from among the output signals of the I-number of storage elements D for the data inputted based on the ECC control signal $S_c$. The weight may be, for example, either 0 or 1.

Each of the plurality of ECC decoding controllers 150 and 160 may include I-number of storage elements D, and may output the data inputted based on the ECC control signal $S_c$ generated by the control signal generator 140 via the number of storage elements D corresponding to the ECC control signal $S_c$ from among the I-number of storage elements D.

In example embodiments, each of the plurality of ECC decoding controllers 150 and 160 may output any one of a plurality of output data of the I-number of storage elements D connected in series, based on the ECC control signal $S_c$.

In example embodiments, each of the plurality of ECC decoding controllers 150 and 160 may receive either data of adding data of multiplying output data s of decoding input data $r_l$ through $r_p$ by a weight that may or may not be predetermined, for example, any one weight of go through $g_{n-k-1}$, to the input data $r_l$, through $r_p$, or data of adding data of multiplying output data s of decoding input data $r_l$ through $r_p$ by any one of weights to the output data of the ECC decoding controller 150, and output the signal outputted via the number of storage elements D corresponding to the ECC control signal $S_c$ from among the output signals of the I-number of storage elements D for the data inputted based on the ECC control signal $S_c$.

In example embodiments, the output data s of decoding input data $r_l$ through $r_p$ may be data of multiplying the signal outputted from the ECC decoding controller 160 by a weight $g_{n-k}$ that may or may not be predetermined.

The encoding unit includes a plurality of adders 131 through 133, and encodes, using a plurality of data outputted from the plurality of ECC encoding controllers 110 and 120, the input data a for encoding (hereinafter, "encoding input data") into an m number of independent subdata $c_l$ through $c_m$ corresponding to the ECC control signal $S_c$.

In example embodiments, a connection state of the plurality of ECC encoding controllers 110 and 120 and/or the encoding unit may be determined by a generator polynomial of an I-interleaved coding scheme, and the connection state may be largely unchanged depending on a change of an I value.

In example embodiments, m may be an integer in a range of $1 \leq m \leq I$.

In example embodiments, the encoding unit may include a plurality of exclusive adders besides the plurality of adders, depending on an encoding method.

The decoding unit also may include a plurality of adders 171 through 173, and may output, using a plurality of data outputted from the plurality of ECC decoding controllers 150 and 160, data for decoding a plurality R of independent input data $r_l$ through $r_p$ (hereinafter, "a plurality of decoding input data") into one piece of output data s.

In example embodiments, the plurality R of independent input data $r_l$ through $r_p$ is decoded into the one piece of output data s using the data outputted from each of the plurality of adders 171 through 173.

In example embodiments, when the channel is the memory, the plurality R of independent input data $r_1$ through $r_p$ may be a plurality R of subdata that may be encoded via the plurality of ECC encoding controllers 110 and 120, and/or the plurality of adders 131 through 133, and/or may be stored in the memory. Since the plurality of subdata stored in the memory may be decoded, a number p of the plurality of decoded independent input data $r_1$ through $r_p$ may be different from a number m of the plurality of subdata $c_1$ through $c_m$ in which the specific data may be encoded and may be stored in the memory. In example embodiments, m and p of FIG. 1 may be either an equal value or different values.

In example embodiments, a connection state of the plurality of ECC decoding controllers 150 and 160 and/or the decoding unit may be determined by the generator polynomial of the I-interleaved coding scheme, and the connection state may be virtually constant depending on the change of the I value.

In example embodiments, p may be an integer in a range of $1 \leq I \leq I$.

In example embodiments, the decoding unit may include a plurality of exclusive adders besides the plurality of adders, depending on a decoding method.

As described above, the ECC apparatus according to example embodiments may perform encoding and/or decoding using the plurality of data outputted via the number of storage elements D corresponding to the error level of the channel side from among the I-number of storage elements D.

An application example of the ECC apparatus according to example embodiments may be described as follows.

As an example, the ECC apparatus according to example embodiments may be applied to a memory core selecting and using an m-bit/cell method having a high error level of the channel side and/or an m'-bit/cell method (m'<m) having a low error level of the channel side. In example embodiments, since a channel error level may be low when the memory core is operated in the m'-bit/cell method, the ECC apparatus may perform an error correction using I1-number of storage elements D being a portion of the I-number of storage elements D. Since the channel error level may be high when the memory core is operated in the m-bit/cell method, the ECC apparatus may perform the error correction using I2 (I1<I2<I)-number of storage elements D. In example embodiments, since the ECC apparatus may be reconfigured from an identical parent generator polynomial, overall hardware complexity may be slightly increased, although a number of storage elements D may be variable depending on each case, for example, I1, I2, and the like. Accordingly, the hardware complexity in this case may be less than the hardware complexity when the ECC apparatus is separately used, depending on each case.

As another example, the ECC apparatus according to example embodiments may be applied to the memory core of the m-bit/cell method having a different error level for each page. In example embodiments, the ECC apparatus may perform the error correction for a page having a low error level using I3 storage elements D being a portion of the I-number of storage elements D, and the ECC apparatus may perform the error correction for a page having a high error level using I4 (I3<I4<I)-number of storage elements D.

Figure 2:
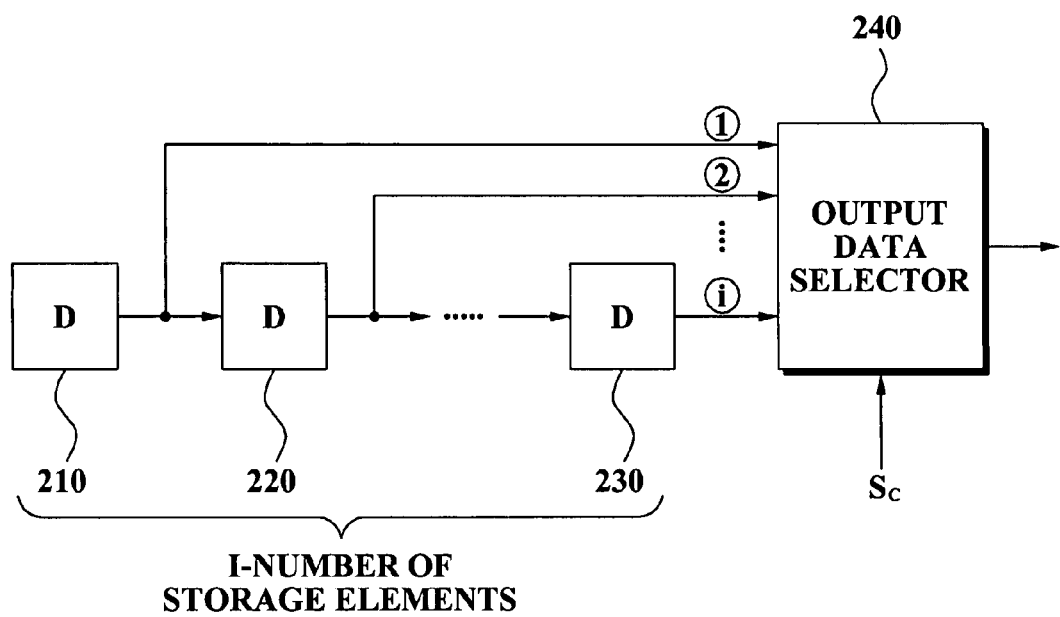
FIG. 2 is a diagram illustrating either an ECC encoding controller or an ECC decoding controller of FIG. 1 in detail.

FIG. 2 is a diagram illustrating either an ECC encoding controller or an ECC decoding controller of FIG. 1 in detail.

In example embodiments, the ECC encoding controller and the ECC decoding controller may have an identical structure. Accordingly, only the ECC encoding controller is described in FIG. 2.

Referring to FIG. 2, the ECC encoding controller may include I-number of storage elements 210 through 230, and/or an output data selector 240.

The I-number of storage elements 210 through 230 may be connected in series, and/or each storage element may be outputted after delaying inputted data.

The output data selector 240 may output any one of a plurality of output data of the I-number of storage elements 210 through 230, based on an ECC control signal $S_c$. In example embodiments, the output data selector 240 may output output data of a number of storage elements, depending on a channel error level.

For example, when the ECC encoding controller includes four storage elements, and the channel error level is divided into E1, E2, E3, and E4 (E1<E2<E3<E4), the output data selector 240 may output output data ① of a first storage element from among output data of the four storage elements for the inputted data when the ECC control signal $S_c$ corresponding to the channel error level E1 is inputted.

Similarly, the output data selector 240 may output output data ④ of a final storage element, that is, a fourth storage element, from among the output data of the four storage elements for the inputted data when the ECC control signal $S_c$ corresponding to the channel error level E4 is inputted.

In example embodiments, the output data selector 240 may be a multiplexer outputting any one of a plurality of input data using the ECC control signal $S_c$ as a selection signal. In example embodiments, when the ECC encoding controller includes four storage elements, the output data selector 240 may be a 4×1 multiplexer.

As described above, the ECC apparatus according to example embodiments may select a signal corresponding to a channel error level from among output signals of storage elements depending on the channel error level and/or variably control ECC performance, thereby improving a code rate and/or reducing latency.

Figure 3:
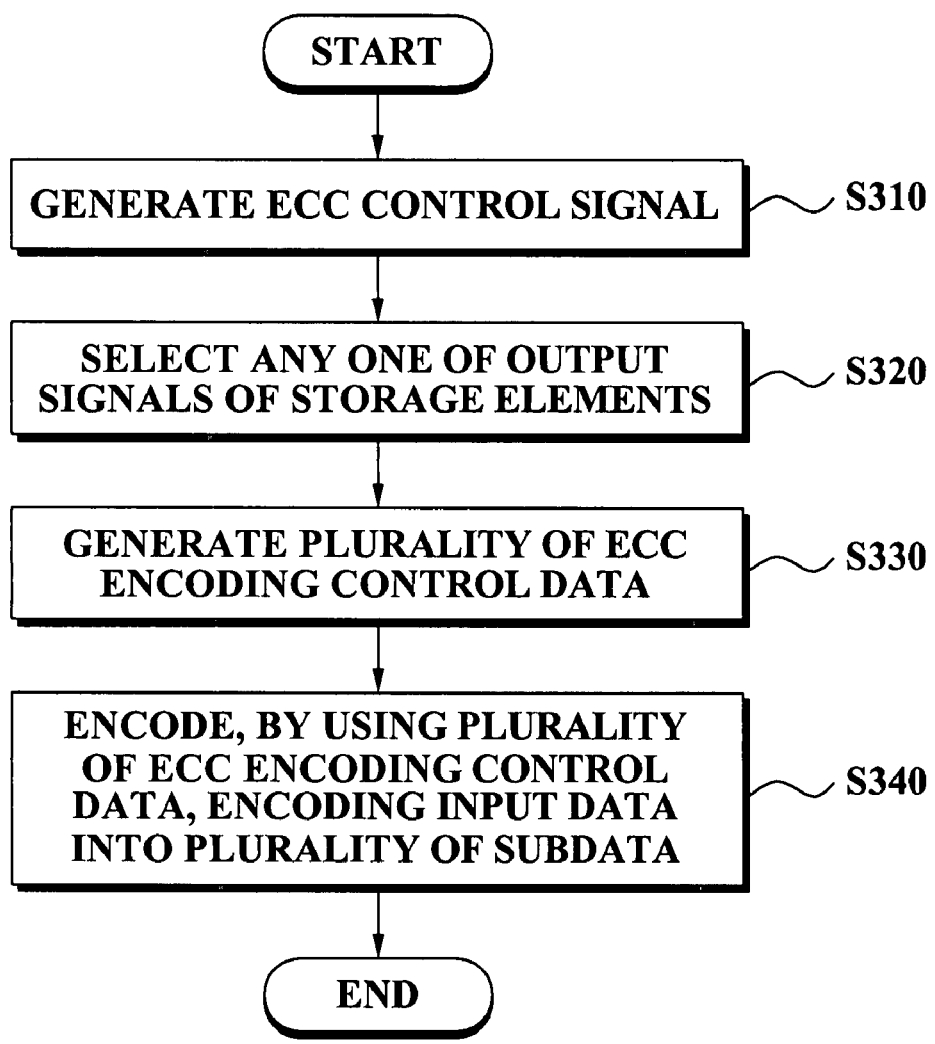
FIG. 3 is a flowchart illustrating an ECC method according to exemplary embodiments.

FIG. 3 is a flowchart illustrating an ECC method according to example embodiments. For example, the flowchart may illustrate an encoding process using an I-interleaved coding scheme.

Referring to FIG. 3, the ECC method may generate an ECC control signal $S_c$ based on channel information in operation S310.

In example embodiments, the channel information may be a BER of a channel side, an RSSI of a channel side, a user input signal inputted from a user, and the like.

In example embodiments, a channel may be a communication channel, a storage channel, and the like, and examples of the channel may be a wireless section, a HD, a CD, a DVD, a memory, and the like. Also, the channel in the ECC method according to example embodiments may be the memory.

As an example of the channel information, when the memory of the MLC method is used for the channel, the channel information may be bit information of data stored in the memory.

In example embodiments, the ECC control signal $S_c$ may be a control signal for controlling ECC performance, depending on an error level of the channel side, and a value of the ECC control signal $S_c$ may be changed depending on a circumstance.

When the ECC control signal $S_c$ is generated, an output signal corresponding to the ECC control signal $S_c$ may be selected from output signals of I-number of storage elements, based on the generated ECC control signal $S_c$ in operation S320.

Data respectively inputted may be outputted via a number of storage elements corresponding to the ECC control signal $S_c$ from among the I-number of storage elements, and/or a plurality of ECC encoding control data may be generated in operation S330.

In example embodiments, the plurality of ECC encoding control data may be generated or may be outputted using the number of storage elements corresponding to the ECC control signal $S_c$ generated from among the I-number of storage elements, depending on the error level of the channel side.

In example embodiments, each of the plurality of ECC encoding control data may be any one of a plurality of output data of the I-number of storage elements, based on the ECC control signal $S_c$.

Encoding input data may be encoded into a plurality of independent subdata using the plurality of ECC encoding control data in operation S340.

In example embodiments, a number of the plurality of independent subdata may be a number corresponding to the ECC control signal $S_c$. For example, when the number corresponding to the ECC control signal $S_c$ is three, the number of the generated plurality of independent subdata may also be three.

Figure 4:
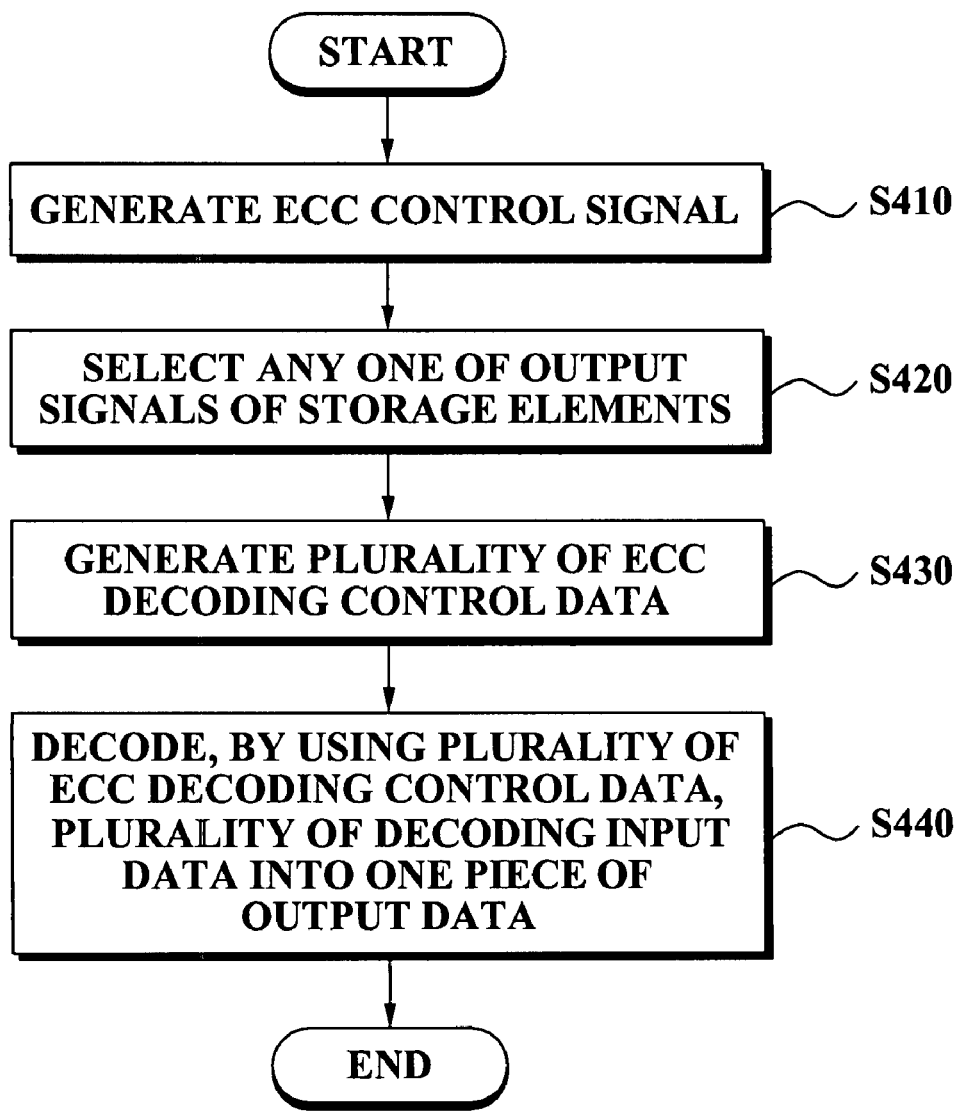
FIG. 4 is a flowchart illustrating an ECC method according to exemplary embodiments.

FIG. 4 is a flowchart illustrating an ECC method according to exemplary embodiments. For example, the flowchart may illustrate a decoding process using an I-interleaved coding scheme.

Referring to FIG. 4, the ECC method may generate an ECC control signal $S_c$ based on channel information in operation S410.

In example embodiments, the ECC control signal $S_c$ required for the decoding process may use the ECC control signal $S_c$ used when a plurality of independent decoding input data for decoding is encoded in an ECC encoding block.

In example embodiments, the channel information may be a BER of a channel side, an RSSI of a channel side, a user input signal inputted from a user, and the like.

When the ECC control signal $S_c$ is generated, an output signal corresponding to the ECC control signal $S_c$ may be selected from output signals of I-number of storage elements D, based on the generated ECC control signal $S_c$, in operation S420.

Data respectively inputted may be outputted via a number of storage elements D corresponding to the ECC control signal $S_c$ from among the I-number of storage elements D, and/or a plurality of ECC decoding control data may be generated, in operation S430.

In example embodiments, the plurality of ECC decoding control data may be generated or may be outputted using the number of storage elements D corresponding to the ECC control signal $S_c$ generated from among the I-number of storage elements D, depending on the error level of the channel side.

In example embodiments, each of the plurality of ECC decoding control data may be any one of a plurality of output data of the I-number of storage elements D, based on the ECC control signal $S_c$.

A plurality of independent decoding input data may be decoded into one piece of output data using the plurality of ECC decoding control data in operation S440.

Figure 5:
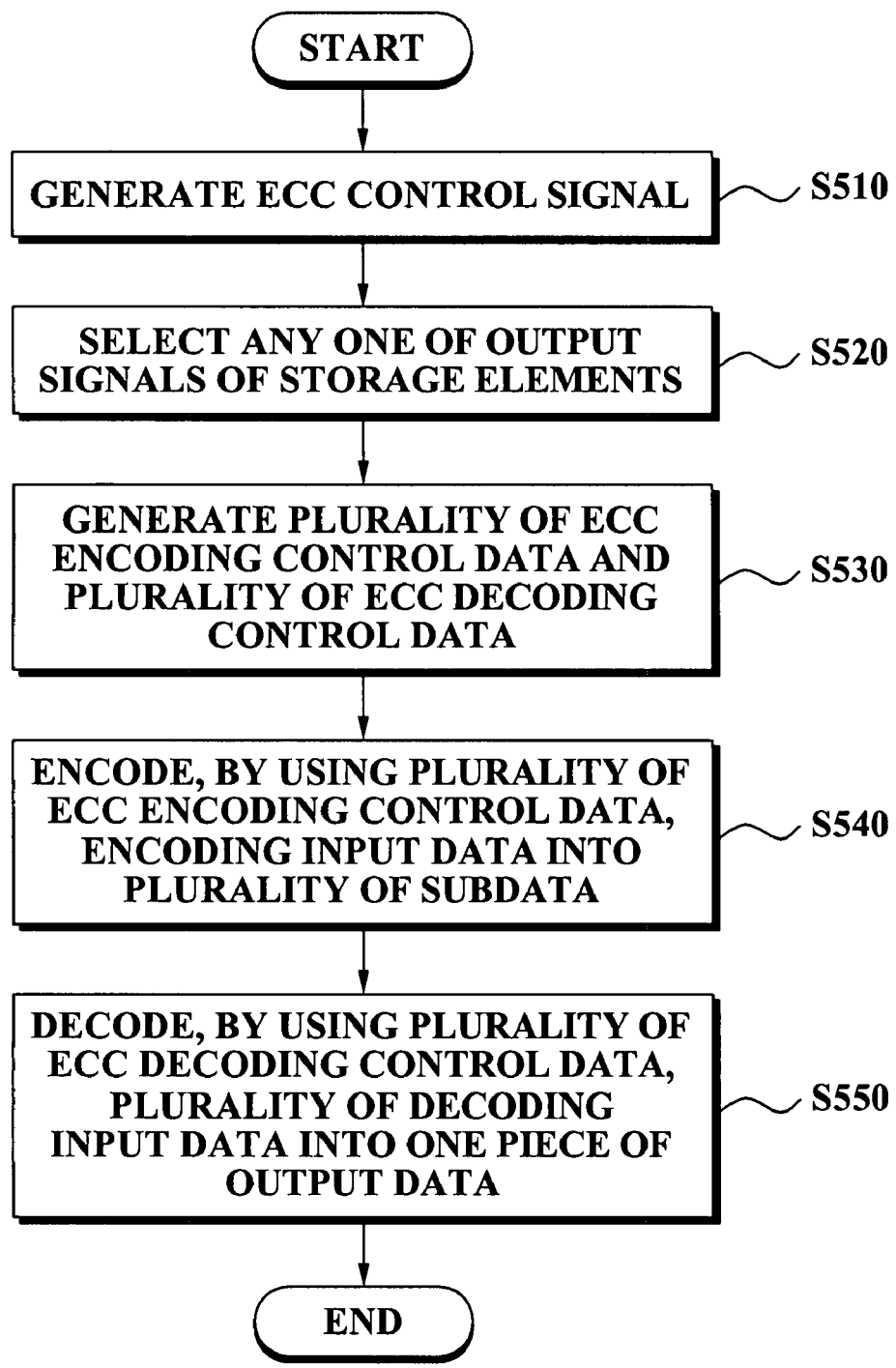
FIG. 5 is a flowchart illustrating an ECC method according to exemplary embodiments.

FIG. 5 is a flowchart illustrating an ECC method according to example embodiments.

Referring to FIG. 5, the ECC method may generate an ECC control signal $S_c$ based on channel information in operation S510.

In example embodiments, the channel information may be a BER of a channel side, an RSSI of a channel side, a user input signal inputted from a user, and the like.

When the ECC control signal $S_c$ is generated, an output signal corresponding to the ECC control signal $S_c$ may be selected from output signals of I-number of storage elements D, based on the generated ECC control signal $S_c$, in operation S520.

Data respectively inputted may be outputted via a number of storage elements D corresponding to the ECC control signal $S_c$ from among the I-number of storage elements D, and/or a plurality of ECC encoding control data and/or a plurality of ECC decoding control data may be generated in operation S530.

In example embodiments, the plurality of ECC encoding control data and/or the plurality of ECC decoding control data may be generated and/or may be outputted using the number of storage elements corresponding to the ECC control signal $S_c$ generated from among the I-number of storage elements, depending on the error level of the channel side.

In example embodiments, each of a plurality of ECC encoding control data and/or the plurality of ECC decoding control data may be any one of a plurality of output data of the I-number of storage elements, based on the ECC control signal $S_c$.

Encoding input data may be encoded into a plurality of independent subdata using the plurality of ECC encoding control data in operation S540.

A plurality of independent decoding input data may be decoded into one piece of output data using the plurality of ECC decoding control data in operation S550.

Although FIG. 5 illustrates that operation S540 and operation S550 are sequentially performed, example embodiments are not limited thereto. Also, two operations S540 and S550 may be simultaneously performed, and operation S550 may be performed before operation S540.

When a decoding speed is required to be increased, the plurality of independent decoding input data may be decoded in parallel, thereby increasing the decoding speed.

The ECC method according to example embodiments may be recorded in computer-readable media including program instructions to implement various operations embodied by a computer. The media may also include, alone or in combination with the program instructions, data files, data structures, and the like. The media a nd program instructions may be those specially designed and constructed for the purposes of example embodiments, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of example embodiments.

ECC apparatuses and/or methods according to example embodiments may control a number of storage elements, depending on an error level generated in a channel from a generator polynomial using an I-interleaved coding scheme, thereby reducing latency of encoding and/or decoding.

Also, ECC apparatuses and/or methods according to example embodiments may control a number of storage elements depending on an error level generated in a channel, thereby improving a code rate.

Also, ECC apparatuses and/or methods according to example embodiments may provide an ECC structure that may control ECC performance depending on an error level generated in a channel using an I-interleaved coding scheme, and/or may have low-level complexity.

Also, ECC apparatuses and/or methods according to example embodiments may provide an ECC structure that may control ECC performance, depending on a change of an error level when an error level of a channel is changed, depending on a number of times of repetitious usage of a product or a period of time of usage.

Also, ECC apparatuses and/or methods according to example embodiments may provide an ECC structure that may control ECC performance, depending on a change of a channel error level by a SLC operation method and/or an MLC operation method of a memory cell when a memory is used for a channel.

Also, ECC apparatuses and/or methods according to example embodiments may provide an ECC structure that may control ECC performance, depending on a change of an error level for a usage bit including an MSB, an LSB, and the like when a memory of an MLC operation method is used for a channel.

While example embodiments have been particularly shown and described, it will be understood by those of ordinary skill in the art that various changes in form and details may be made therein without departing from the spirit and scope of the present invention as defined by the following claims.

What is claimed is:

1. An Error Control Code (ECC) apparatus, the apparatus comprising:
    a control signal generator that generates an ECC control signal based on channel information;
    a plurality of ECC encoding controllers that output data respectively inputted via a number of first, second, or first and second storage elements corresponding to the ECC control signal; and
    an encoding unit that encodes, using a plurality of data outputted from the plurality of ECC encoding controllers, encoding input data into a number of subdata corresponding to the ECC control signal.

2. The apparatus of claim 1, wherein each of the plurality of ECC encoding controllers includes I-number of the first storage elements connected in series, and
    wherein each of the plurality of ECC encoding controllers outputs the inputted data via the number of the first, second, or first and second storage elements corresponding to the ECC control signal from among the I-number of the first storage elements.

3. The apparatus of claim 2, wherein each of the plurality of ECC encoding controllers further comprises:
    an output data selector that outputs any one of a plurality of output data of the I-number of the first storage elements, based on the ECC control signal.

4. The apparatus of claim 3, wherein the output data selector is a multiplexer outputting, using the ECC control signal as a selection signal, any one of the plurality of output data of the I-number of the first storage elements corresponding to the selection signal.

5. The apparatus of claim 1, wherein the channel information is a Bit Error Rate (BER) of a channel side.

6. The apparatus of claim 1, wherein the channel information is a Received Signal Strength Indication (RSSI) of a channel side.

7. The apparatus of claim 1, wherein the channel information is an input signal inputted from a user.

8. The apparatus of claim 1, wherein the channel information is channel information of a memory.

9. The apparatus of claim 1, further comprising:
    a plurality of ECC decoding controllers that output data respectively inputted via a number of the first, second, or first and second storage elements corresponding to the ECC control signal; and
    a decoding unit that decodes, using a plurality of data outputted from the plurality of ECC decoding controllers, a number of decoding input data corresponding to the ECC control signal into one piece of output data.

10. The apparatus of claim 9, wherein each of the plurality of ECC encoding controllers includes I-number of the first storage elements connected in series,
    wherein each of the plurality of ECC decoding controllers includes I-number of the second storage elements connected in series,
    wherein each of the plurality of ECC encoding controllers outputs the inputted data via the number of the first, second, or first and second storage elements corresponding to the ECC control signal from among the I-number of the first storage elements, and
    wherein each of the plurality of ECC decoding controllers outputs the inputted data via the number of the first, second, or first and second storage elements corresponding to the ECC control signal from among the I-number of the second storage elements.

11. The apparatus of claim 10, wherein each of the plurality of ECC encoding controllers further comprises an output data selector that outputs any one of a plurality of output data of the I-number of the first storage elements, based on the ECC control signal, and
    wherein each of the plurality of ECC decoding controllers further comprises an output data selector that outputs any one of a plurality of output data of the I-number of the second storage elements, based on the ECC control signal.

12. The apparatus of claim 9, wherein the channel information is a Bit Error Rate (BER) of a channel side.

13. The apparatus of claim 9, wherein the channel information is a Received Signal Strength Indication (RSSI) of a channel side.

14. The apparatus of claim 9, wherein the channel information is an input signal inputted from a user.

15. An Error Control Code (ECC) apparatus, the apparatus comprising:
    a control signal generator that generates an ECC control signal based on channel information;
    a plurality of ECC decoding controllers that output data respectively inputted via a number of first, second, or first and second storage elements corresponding to the ECC control signal; and
    a decoding unit that decodes, using a plurality of data outputted from the plurality of ECC decoding controllers, a number of decoding input data corresponding to the ECC control signal into one piece of output data.

16. The apparatus of claim 15, wherein each of the plurality of ECC decoding controllers includes I-number of the second storage elements connected in series, and
wherein each of the plurality of ECC decoding controllers outputs the inputted data via the number of the first, second, or first and second storage elements corresponding to the ECC control signal from among the I-number of the second storage elements.

17. The apparatus of claim 16, wherein each of the plurality of ECC decoding controllers further comprises:
an output data selector that outputs any one of a plurality of output data of the I-number of the second storage elements, based on the ECC control signal.

18. The apparatus of claim 17, wherein the output data selector is a multiplexer outputting, using the ECC control signal as a selection signal, any one of the plurality of output data of the I-number of the second storage elements corresponding to the selection signal.

19. The apparatus of claim 15, wherein the channel information is a Bit Error Rate (BER) of a channel side.

20. The apparatus of claim 15, wherein the channel information is a Received Signal Strength Indication (RSSI) of a channel side.

21. The apparatus of claim 18, wherein the channel information is an input signal inputted from a user.

22. The apparatus of claim 15, wherein the channel information is channel information of a memory.

23. An Error Control Code (ECC) method, the method comprising:
generating an ECC control signal based on channel information;
outputting data respectively inputted via a number of storage elements corresponding to the ECC control signal;
generating a plurality of ECC encoding control data; and
encoding, using the plurality of ECC encoding control data, encoding input data into a number of subdata corresponding to the ECC control signal.

24. The method of claim 23, further comprising:
generating a plurality of ECC decoding control data; and
decoding, using the plurality of ECC decoding control data, a number of decoding input data corresponding to the ECC control signal into one piece of output data.

25. An Error Control Code (ECC) method, the method comprising:
generating an ECC control signal based on channel information;
outputting data respectively inputted via a number of storage elements corresponding to the ECC control signal;
generating a plurality of ECC decoding control data; and
decoding, using the plurality of ECC decoding control data, a number of decoding input data corresponding to the ECC control signal into one piece of output data.

26. A non-transitory computer-readable recording medium storing a program for implementing an Error Control Code (ECC) method, the method comprising:
generating an ECC control signal based on channel information;
outputting data respectively inputted via a number of storage elements corresponding to the ECC control signal;
generating a plurality of ECC encoding control data; and
encoding, using the plurality of ECC encoding control data, encoding input data into a number of subdata corresponding to the ECC control signal.

27. The non-transitory computer-readable recording medium of claim 26, the method further comprising:
generating a plurality of ECC decoding control data; and
decoding, using the plurality of ECC decoding control data, a number of decoding input data corresponding to the ECC control signal into one piece of output data.

28. A non-transitory computer-readable recording medium storing a program for implementing an Error Control Code (ECC) method, the method comprising:
generating an ECC control signal based on channel information;
outputting data respectively inputted via a number of storage elements corresponding to the ECC control signal;
generating a plurality of ECC decoding control data; and
decoding, using the plurality of ECC decoding control data, a number of decoding input data corresponding to the ECC control signal into one piece of output data.

* * * * *